(12) United States Patent
Sun

(10) Patent No.: US 8,947,862 B2
(45) Date of Patent: Feb. 3, 2015

(54) EXPANSION CARD MODULE

(71) Applicant: Giga-Byte Technology Co., Ltd., New Taipei (TW)

(72) Inventor: Pei Hua Sun, New Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 213 days.

(21) Appl. No.: 13/761,163

(22) Filed: Feb. 7, 2013

(65) Prior Publication Data

US 2014/0185208 A1 Jul. 3, 2014

(30) Foreign Application Priority Data

Dec. 27, 2012 (TW) ............................. 101150663 A

(51) Int. Cl.
*G06F 1/16* (2006.01)
*G06F 1/18* (2006.01)

(52) U.S. Cl.
CPC ...................................... *G06F 1/186* (2013.01)
USPC ..................................................... 361/679.02

(58) Field of Classification Search
USPC .............. 361/679.02, 679.37, 679.38, 679.39
See application file for complete search history.

(56) References Cited

U.S. PATENT DOCUMENTS

| | | | | |
|---|---|---|---|---|
| 5,519,571 A * | 5/1996 | Shieh | ........................ | 361/679.37 |
| 5,692,208 A * | 11/1997 | Felcman et al. | ......... | 361/679.38 |
| 5,831,820 A * | 11/1998 | Huang | ..................... | 361/679.38 |
| 6,034,868 A * | 3/2000 | Paul | ......................... | 361/679.02 |
| 6,304,436 B1 * | 10/2001 | Branch et al. | ................. | 361/753 |
| 6,496,364 B1 * | 12/2002 | Medin et al. | ................ | 361/679.4 |
| 6,552,909 B1 * | 4/2003 | Liebenow | ..................... | 361/725 |
| 6,856,509 B2 * | 2/2005 | Lin | ........................... | 361/679.02 |
| 8,363,394 B2 * | 1/2013 | Chen et al. | ................ | 361/679.33 |
| 2003/0235031 A1 * | 12/2003 | Lo | .................................. | 361/685 |
| 2004/0246675 A1 * | 12/2004 | Lin | ................................. | 361/686 |
| 2008/0218959 A1 * | 9/2008 | Wu et al. | ........................ | 361/685 |
| 2008/0225494 A1 * | 9/2008 | Yang | ............................. | 361/727 |
| 2013/0342983 A1 * | 12/2013 | Wang et al. | ............... | 361/679.02 |

* cited by examiner

*Primary Examiner* — Lisa Lea Edmonds
(74) *Attorney, Agent, or Firm* — Chun-Ming Shih

(57) ABSTRACT

An expansion card module includes a box, a tray, a circuit board, and an interconnection device. The box is disposed in a drive bay on the front of a case of a computer. The tray is movably installed in the box and has a slide mechanism. The tray slides into or out of the box by the slide mechanism. The circuit board is disposed on the tray and has a first expansion slot. An expansion card electrically inserts into the first expansion slot of the circuit board, and the circuit board is electrically connected to the motherboard of computer through the interconnection device.

9 Claims, 8 Drawing Sheets

EXPANSION CARD MODULE

CROSS-REFERENCES TO RELATED APPLICATIONS

This non-provisional application claims priority under 35 U.S.C. §119(a) on Patent Application No. 101150663 filed in Taiwan, R.O.C. on Dec. 27, 2012, the entire contents of which are hereby incorporated by reference.

BACKGROUND

1. Technical Field

This disclosure relates to an expansion card module, and more particularly to an expansion card module disposed in a drive bay on the front of a case of a computer.

2. Related Art

About current motherboards in the computer system, in order to use peripheral devices, different kinds of expansion slots are set up for connecting expansion cards of the input/output peripheral devices to the motherboards. The data transmission interfaces of the peripheral devices are different, for example, Accelerated Graphics Port (AGP), Peripheral Component Interconnect (PCI), or Industry Standard Architecture (ISA). These expansion cards inserting into the expansion card slots can enhance the overall function of the computer or establish communication to special peripheral devices, so as to meet different needs of the computer system.

Some other electronic devices such as an optical-disk drive and a hard drive are set up around general motherboard. Usually, the expansion slots are blocked by the aforementioned devices around the motherboard. As a result, space is not enough to install and uninstall the expansion card. With limited space in some types of computers, users must uninstall other expansion cards and then uninstall the innermost expansion card when replacing the expansion cards near the motherboard, for avoiding damaging electronic devices around during installation, which is very time-consuming and inconvenient.

For the computers in the prior art, regardless of inserting the expansion cards directly to the motherboard or installing the expansion cards via adapters, users have to open the computer case when replacing expansion cards, causing the installation complex and time-consuming.

Therefore, making the expansion cards able to be installed or uninstalled outside the computer case to save time, simplifying installation procedures, and saving interior space of the computer are important issues for manufactures of the electronic devices and expansion cards.

SUMMARY OF THIS DISCLOSURE

In view of the above problems, this disclosure provides an expansion card module to solve the inconvenience that complex and time-consuming procedures such as opening the computer case firstly are required before installing and uninstalling expansion cards.

This disclosure provides an expansion card module disposed in a drive bay on the front of a case of a computer to provide a slot for an expansion card electrically connecting to the computer via the expansion card module, wherein a motherboard is disposed in the case of the computer. The expansion card module includes a box, a tray, a circuit board, and an interconnection device. The box is disposed in the drive bay on the front of the case of the computer. The tray is movably installed in the box therein and has a slide mechanism, and the tray slides into or out of the box by the slide mechanism. The circuit board is disposed on the tray and has a first expansion slot. An expansion card electronically inserts into the first expansion slot of the circuit board, and the circuit board is electrically connected to the motherboard of computer through the interconnection device.

The expansion card module makes the expansion card inside the expansion card module move into or out of the computer, such that users can replace or install the expansion card without opening the case, and that saving the interior space of the computer by using the space of the drive bay on the front of the computer case.

The detail of this disclosure can be better appreciated from the following detailed description of this disclosure, taken in conjunction with the attached drawings.

BRIEF DESCRIPTION OF THE DRAWINGS

This disclosure will become more fully understood from the detailed description given herein below for illustration only, and thus not limitative of this disclosure, wherein.

DETAILED DESCRIPTION OF THIS DISCLOSURE

Figure 1:
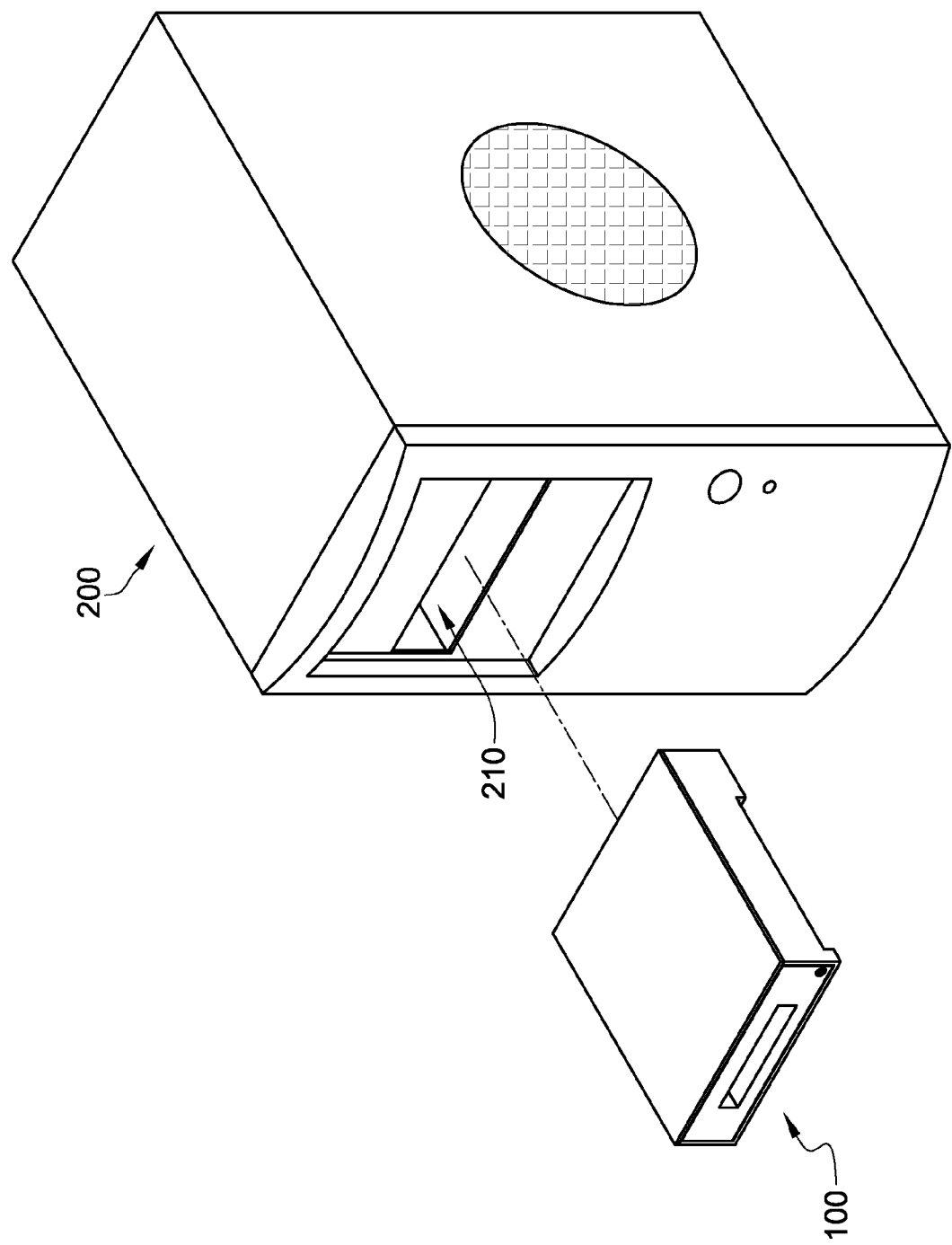
FIG. 1 is perspective view of the expansion card module and the case of the computer according to a first embodiment.

Refer to FIG. 1, this disclosure includes two embodiments, in which an expansion card module 100 is disposed in a drive bay 210 on the front of the case of a desktop computer 200. People having ordinary skill in the art can make proper modification to the appearance and function of the expansion card module 100 according to the actual needs or design requirements, not limited as described herein.

Figure 2:
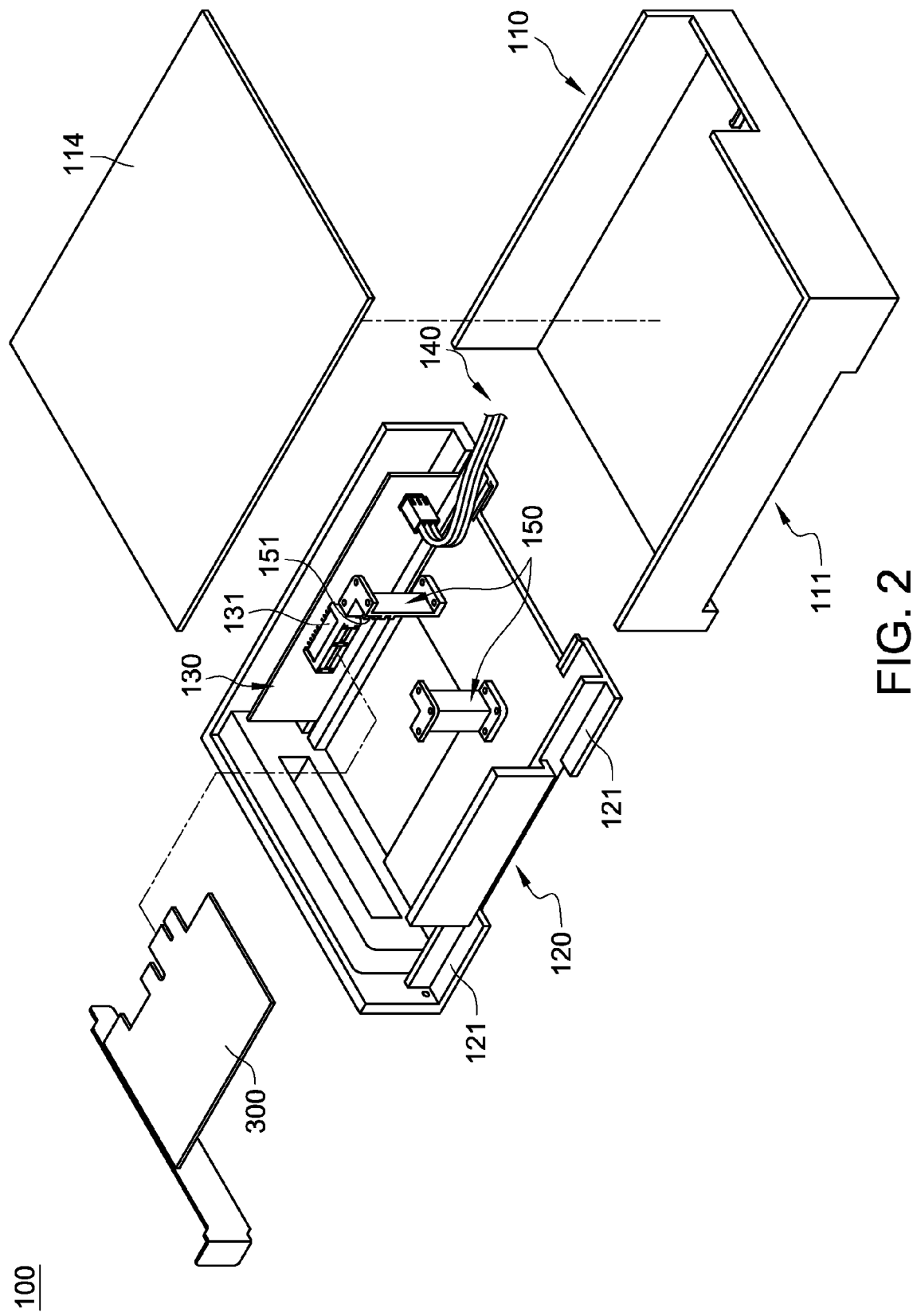
FIG. 2 is an exploded view of the expansion card module according to the first embodiment.
Figure 3:
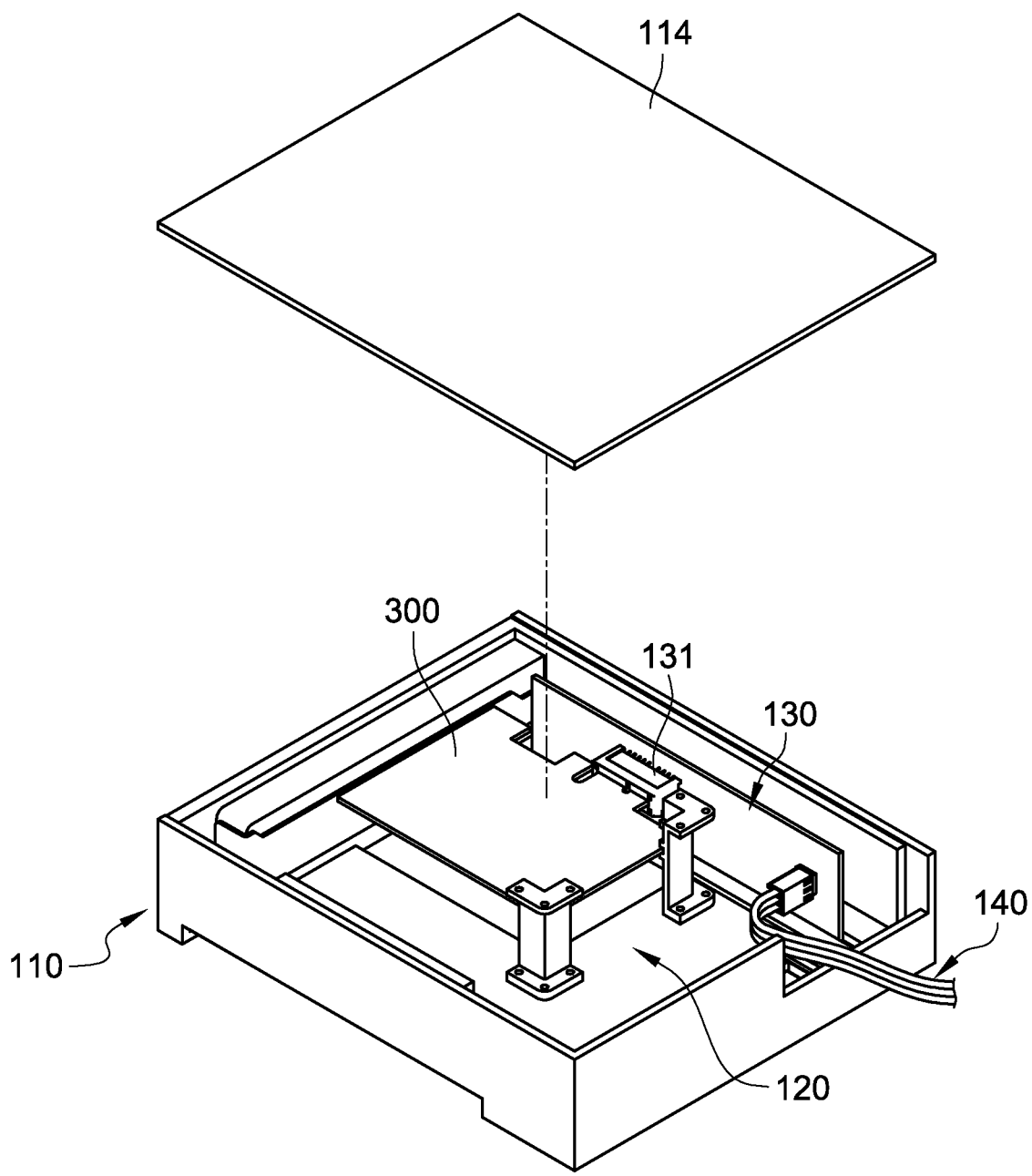
FIG. 3 is a perspective view of the expansion card module according to the first embodiment.
Figure 4:
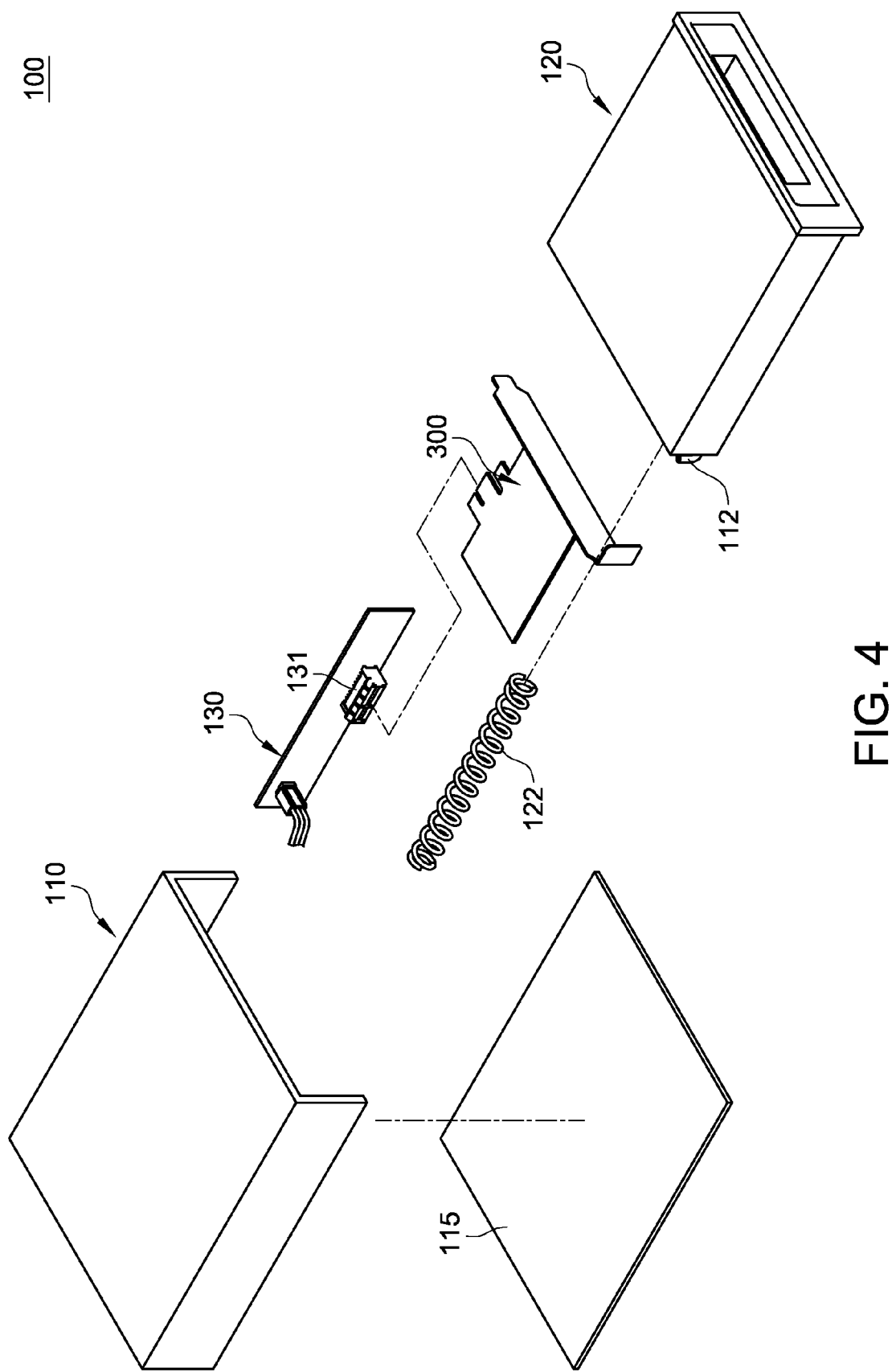
FIG. 4 is an exploded view of the expansion card module according to a second embodiment.
Figure 5:
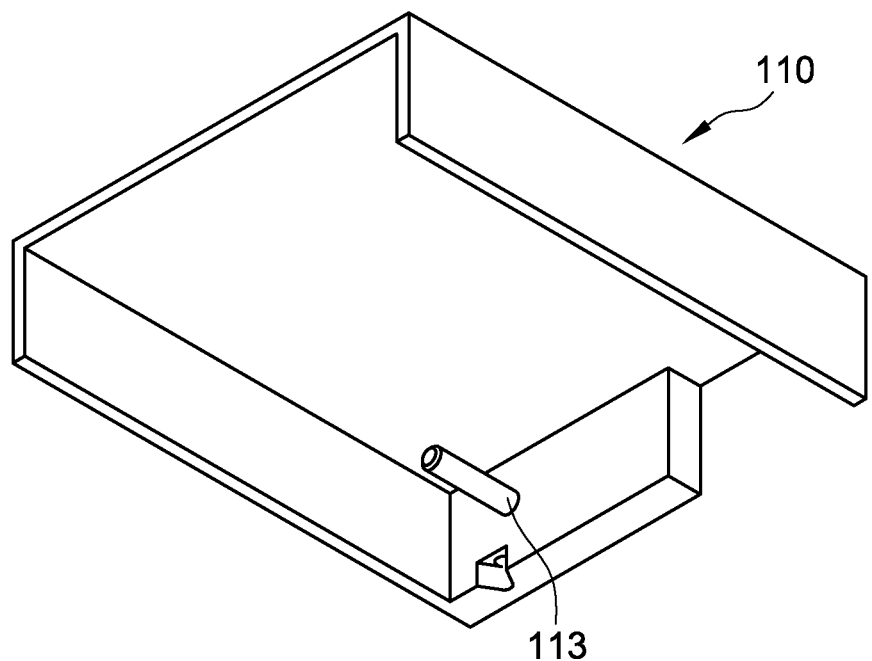
FIG. 5 is a perspective view of the box of the expansion card module according to the second embodiment.
Figure 6:
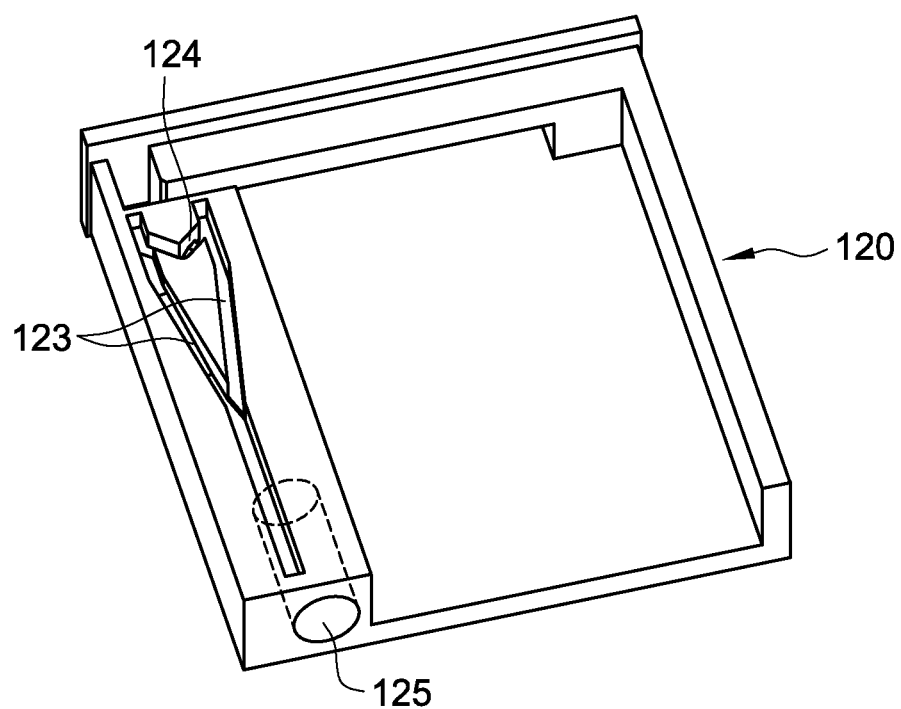
FIG. 6 is a perspective view of the tray of the expansion card module according to the second embodiment.
Figure 7:
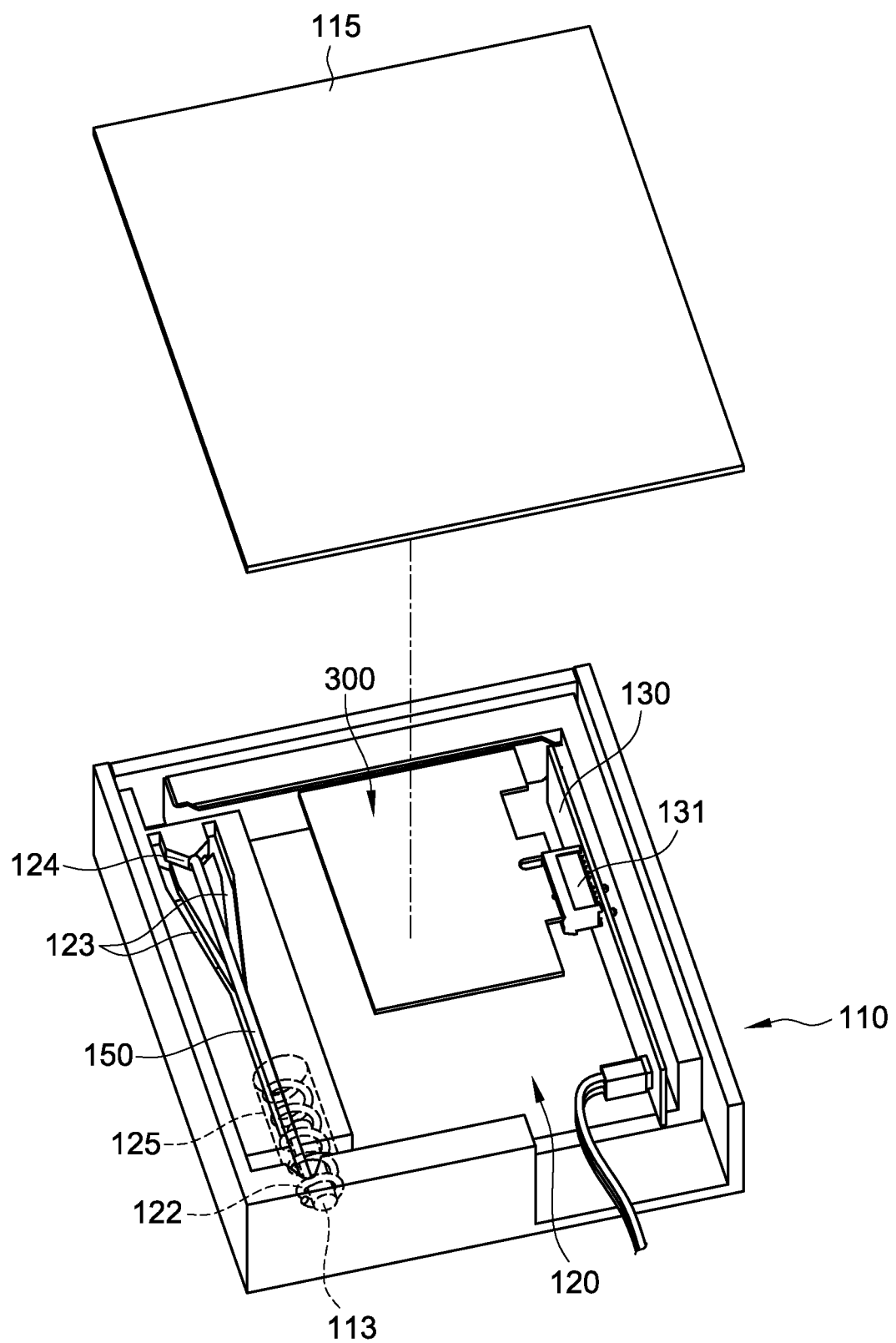
FIG. 7 is a perspective view of the expansion card module according to the second embodiment.

Refer to FIG. 2 and FIG. 3, the expansion card module 100 according to the first embodiment is disposed in the drive bay 210 on the front of the case of the computer 200, the expansion card module 100 is used to carry an expansion card 300 and electrically connect the expansion card 300 to the motherboard 200 of the computer. The motherboard 220 is set up in the computer 200. The interface card 300 described in the embodiment could be a wireless network interface controller, a video card or a TV turner card, not limit as described herein.

The expansion card module 100 includes a box 110, a tray 120, a circuit board 130, and an interconnection device 140. The size of box 110 is 5.25" drive bay, and the box 110 has an upper covering 114 and is disposed in the drive bay 210 on the front of the case of the computer 200. The tray 120 has a slide mechanism and is movably installed in the box 110. The upper covering 114 is for covering the tray 120, such that the dust will not fall into the tray 120. The tray 120 slides into or out of the box 110 by the slide mechanism.

Figure 8:
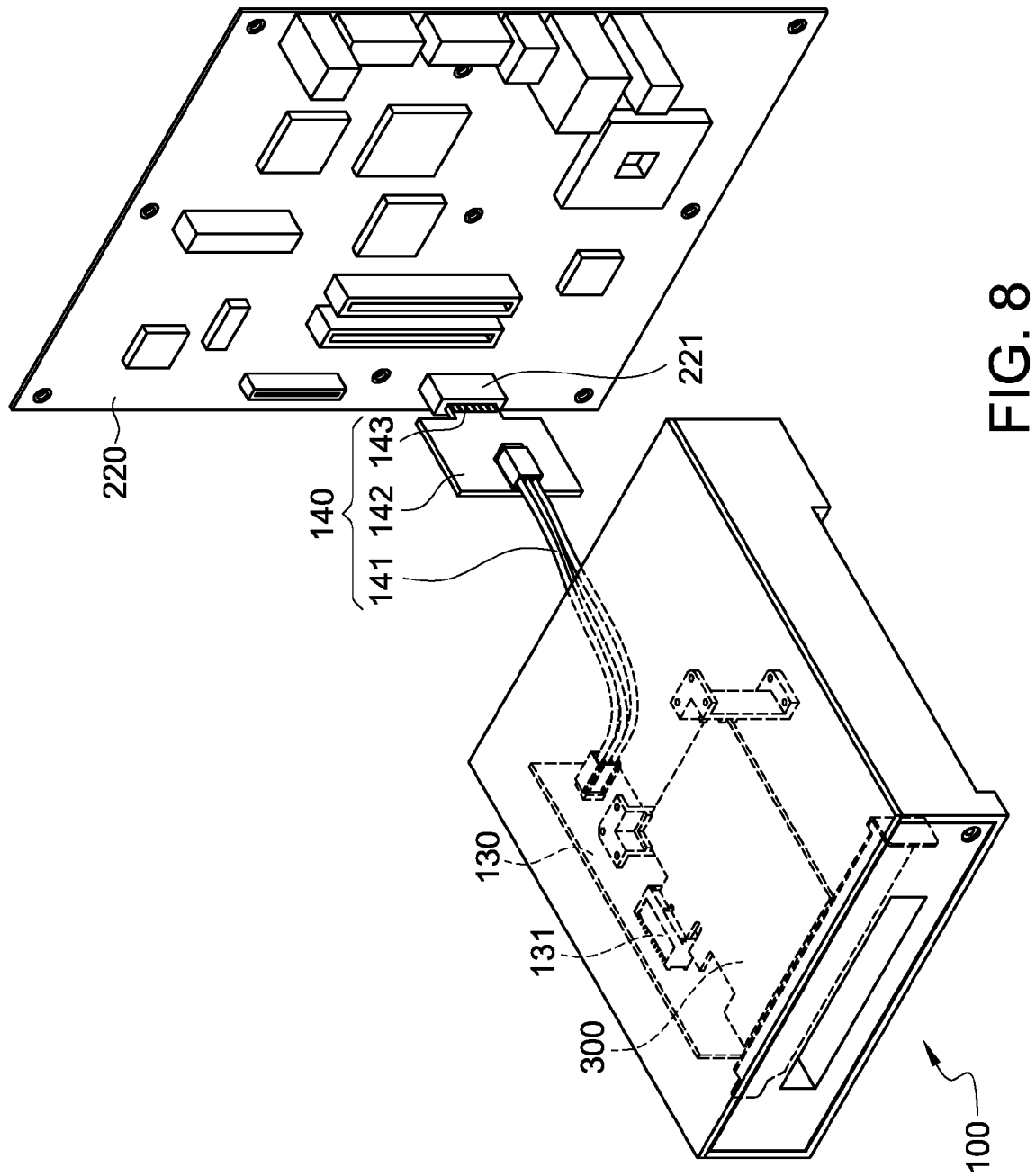
FIG. 8 is a perspective view of the expansion card module connecting to the motherboard according to the first and second embodiment.

Refer to FIG. 8, the circuit board 130 has a first expansion slot 131 and sets up on a side face of the tray 120. The expansion card 300 electronically inserts into the first expansion slot 131 of the circuit board 130, and the interconnection device 140 electronically connects the circuit board 130 to motherboard 220, such that the circuit board 130 is electronically connected to the motherboard 220 via the interconnection device 140.

It is noted that the structures and assembly methods of the two kinds of slide mechanism in the two embodiments of this disclosure will be described respectively in the following. People having ordinary skill in the art can make proper modification to the design according to actual needs, not limited as described herein.

The slide mechanism according to the first embodiment includes a slide portion 121 and an elongated slide trough 111. The slide portion 121 is disposed on a side face of the tray 120, and elongated slide trough 111 is disposed in the box 110 and located at a position corresponding to the position of the slide portion 121, such that the slide portion 121 slides in the elongated slide trough 111 correspondingly. When the tray 120 slides out of the box 110 via the slide portion 121, the expansion card 300 moves with the tray 120 and is exposed outside the computer 200, such that expansion card installation does not require opening the computer case.

The expansion card module 100 further includes a positioning member 150. The positioning member 150 is disposed on the tray 120 and has a notch 151. When the expansion card 300 electronically inserts intoto the first expansion slot 131, the back end of the expansion card 300 is embedded in the notch 151, so that the expansion card 300 is fixed in the first expansion slot 131 and functions well.

The expansion card module 100 uses the space of the drive bay on the front of the computer case to save the interior space of the computer, and the expansion card can move with the expansion card module into or out of the computer via the structure of slide portion and elongated slide trough, such that users can replace or install expansion cards quickly and easily.

About the second embodiment, the overall structure of the expansion card module 100 is similar to that in the first embodiment, so the following will describe in detail only the difference of the two embodiments.

Refer to FIG. 4, FIG. 5, FIG. 6, and FIG. 7, the expansion card module 100 includes a box 110, a tray 120, a circuit board 130, and an interconnection device 140. The box 110 has a bottom plate 115 and is disposed in the drive bay on the front of the case of the computer 200. The tray 120 has a slide mechanism and is movably installed in the box 110, and the tray 120 moves into or out of the box 110 via the slide mechanism. The bottom plate 115 is for covering the tray 120, so that the tray will not be exposed outside the box 110.

The difference of the expansion card module 100 in the second embodiment is that the slide mechanism includes a spring 122, a guide groove 123, a positioning groove 124, a positioning member 112, an opening 125, and a pillar 113.

The guide groove 123 and the positioning groove 124 are disposed in the tray 120 respectively. The guide groove 123 is Y-shaped and communicates the positioning groove 124. The opening 125 is disposed in the tray 120.

The pillar 113 is disposed in the box 110, and the position of the opening 125 corresponds to that of the pillar 113. The spring 122 is sleeved over the pillar 113. One end of the spring 122 withstands the box 110, and the other end of the spring 122 withstands the tray 120 in the opening 125. One end of the positioning member 112 links with the box 110, and the other end of the positioning member 112 is disposed in the guide groove 123 or the positioning groove 124 of the tray 120. When the tray 120 is in the box 110, the positioning member 112 is stuck in the positioning groove 124, users can press the expansion card module 100 outside the computer 200 to make the positioning member 112 move from the positioning groove 112 to the guide groove 123. Then the tray 120 will move out of the computer 200 via the elastic force of the spring, and the positioning member 112 will move along the guide groove 123, such that the expansion card 300 moves with the tray 120 and is exposed outside the computer 200. Therefore, users can replace or install expansion cards 300 quickly and easily without opening the computer case.

Refer to FIG. 8, the interconnection device 140 according to the first and second embodiment includes a bus line 141 and an interconnection card 142. One end of the bus line 141 is electronically connected to the circuit board 130, and the other end of the bus line 141 is electronically connected to the interconnection card 142. One end of the interconnection card 142 has an electronic connection interface 143, and the motherboard 220 has a second expansion slot 221. The interconnection card 142 is electronically connected to the second expansion slot 221 via the electronic connection interface 143. Therefore, when the expansion card 300 electronically is inserted in the circuit board 130, it can transmit electrical signals to the motherboard 220 via the bus line 141 and interconnection card 142 of the interconnection device 140.

We can know from the above embodiments of this disclosure that by disposing the expansion card module 100 in the drive bay on the front of the computer case, we can solve the issue that installing and uninstalling expansion cards require first opening the computer case, causing the procedure complex and time-consuming.

Compared with the prior art, the expansion card module of this disclosure can not only make the expansion card disposed in the expansion card module slides into or out of the computer via the structure of slide portion and the elongated slide trough or the spring mechanism, such that replacing or installing expansion cards does not require opening the computer case, thus saving time and simplifying the installation, but also use the space of the drive bay on the front of the computer case to save the interior space in the computer. Besides, for expansion cards with antenna such as a wireless network interface controller, users can extend the antenna from the drive bay, so as to enhance the ability to receive signals and unleash maximum function of the expansion card.

Though the embodiments of this disclosure are disclosed as described above, these are not to limit this disclosure. People having ordinary skill in the art will recognize that this disclosure can be practiced with modification within the spirit and scope of the claim. It is therefore to be understood that this disclosure is not to be limited by the foregoing description but only by the appended claims.

What is claimed is:

1. An expansion card module, disposed in a drive bay on the front of a case of a computer for an expansion card electrically connecting to the computer via the expansion card module, wherein a motherboard is disposed in the case of the computer, comprising:
   a box, disposed in the drive bay on the front of the case;
   a tray, movably installed in the box, and having a slide mechanism for moving to and fro with respect to the box via the slide mechanism, so as to move the expansion card into or out of the box;
   a circuit board, disposed on the tray, and having a first expansion slot for the expansion card electrically inserting into the first expansion slot; and an interconnection device, electronically connecting the circuit board to the motherboard.

2. The expansion card module as claimed in claim 1, wherein the slide mechanism includes:
   a slide portion, disposed on the tray; and
   an elongated slide trough, disposed in the box, wherein the slide portion is combined with the elongated slide trough in a sliding manner.

3. The expansion card module as claimed in claim 2, further including a positioning member disposed on the tray and having a notch, wherein the one end of the expansion card is embedded in the notch.

4. The expansion card module as claimed in claim 2, wherein the box further includes an upper covering for covering the tray.

5. The expansion card module as claimed in claim 1, wherein the slide mechanism includes:
   a spring, wherein one end of the spring withstands the box and the other end of the spring withstands the tray;
   a guide groove, disposed on the tray;
   a positioning groove, disposed on the tray, wherein the guide groove communicates the positioning groove; and
   a positioning member, wherein one end of the positioning member links with the box, and the other end of the positioning member slides in the guide groove and is optionally stuck in the positioning groove.

6. The expansion card module as claimed in claim 5, wherein the box further includes a pillar, the tray further includes an opening, the spring is sleeved over the pillar, and the two ends of the spring respectively withstand the opening and the pillar.

7. The expansion card module as claimed in claim 5, wherein the box further has a bottom plate for covering the box.

8. The expansion card module as claimed in claim 1, wherein the interconnection device includes a bus line and an interconnection card, the motherboard includes a second expansion slot, the bus line electronically connects the circuit board to the interconnection card, and the interconnection card electronically inserts into the second expansion slot of the motherboard.

9. The expansion card module as claimed in claim 8, wherein one end of the interconnection card includes an electronic connection interface, and the interconnection card electronically inserts into the second expansion slot of the motherboard via the electronic connection interface.

* * * * *